United States Patent [19]
Miyazaki et al.

[11] Patent Number: 4,963,450
[45] Date of Patent: Oct. 16, 1990

[54] ELECTROPHOTOGRAPHIC PHOTOSENSITIVE MEMBER WITH DISAZO PIGMENT

[75] Inventors: Hajime Miyazaki; Shintetsu Go; Akihiro Senoo; Kazushi Iuchi, all of Yokohama; Tetsuro Kanemaru, Tokyo, all of Japan

[73] Assignee: Canon Kabushiki Kaisha, Tokyo, Japan

[21] Appl. No.: 296,790

[22] Filed: Jan. 13, 1989

[30] Foreign Application Priority Data

Jan. 14, 1988 [JP] Japan ................. 63-007300

[51] Int. Cl.$^5$ .................. G03G 5/06; G03G 5/047
[52] U.S. Cl. ...................... 430/59; 435/58; 435/79
[58] Field of Search ................ 430/58, 59, 79

[56] References Cited

U.S. PATENT DOCUMENTS 4,299,896 11/1981 Hashimoto et al. ............ 430/58
4,314,015 2/1982 Hashimoto et al. ............ 430/58
4,610,943 9/1986 Takiguchi et al. ............. 430/76
4,760,003 7/1988 Matsumoto et al. ........... 430/58
4,788,119 11/1988 Yamashita et al. ............ 430/58
4,830,944 5/1989 Umehara et al. .............. 430/59

FOREIGN PATENT DOCUMENTS 031962 2/1984 Japan .
219048 9/1986 Japan .
127845 6/1987 Japan .
147463 7/1987 Japan .

Primary Examiner—Roland E. Martin
Attorney, Agent, or Firm—Fitzpatrick, Cella, Harper & Scinto

[57] ABSTRACT

A laminated layer type electrophotographic photosensitive member has a charge generation layer and a charge transport layer on an electroconductive support, characterized in that the charge generation layer has at least one of disazo pigments represented by the formulae (1) and (2).

6 Claims, 2 Drawing Sheets

ELECTROPHOTOGRAPHIC PHOTOSENSITIVE MEMBER WITH DISAZO PIGMENT

BACKGROUND OF THE INVENTION

1. Field of the Invention

This invention relates to an electrophotographic photosensitive member, more particularly to a laminated layer type electrophotographic photosensitive member comprising a charge generation layer containing a charge generating material and a charge transporting material which receives and transports the carriers generated in the charge generation layer.

2. Related Background Art

In the prior art, as the electrophotographic photosensitive member, an inorganic photosensitive member having a photosensitive layer composed mainly of selenium, cadmium sulfide, zinc oxide, etc. has been widely used. These are not necessarily satisfactory in thermal stability, humidity resistance, durability, etc., and particularly selenium, cadmium sulfide are limited in production and handling due to toxicity. On the other hand, an organic photosensitive member having a photosensitive layer composed mainly of an organic photoconductive compound is attracting attention in recent years for having a number of advantages which compensate for the above drawbacks of inorganic photosensitive members.

As such organic photosensitive member, an electrophotographic photosensitive member having a photosensitive layer composed mainly of a photoconductive polymer as represented by poly-N-vinylcarbazole and a charge transfer complex formed from said polymer and a Lewis acid such as 2,4,7-trinitro-9 fluorenone has been practically applied. However, this photosensitive member is not necessarily satisfactory in sensitivity and durability.

On the other hand, the function separation type electrophotographic photosensitive member having the charge generation function and the charge transport function burdened separately on different substances, respectively, has brought about remarkable improvements to sensitivity and durability which have been the drawbacks of the organic photosensitive members of the prior art. Such function separation type photosensitive member can be very wide in scope of materials for respective charge generation substances and charge transport substances to be selected, and has the advantage that an electrophotographic photosensitive member having any desired characteristics can be produced with relative case.

As the charge generation substance, various azo pigments, phthalocyanine pigments, polycyclic quinone pigments, cyanine dyes, squaric acid dyes, pyrilium salt type dyes, etc. have been known, and among them, for azo pigments, a large number of structures have been proposed for such advantages as strong light resistance, great charge generation ability, easiness in preparation of the material, etc. Also, the present Applicant has previously reported disazo pigments having the benzanthrone skeleton in the molecular structure in Japanese Patent Laid-open Application Nos. 59-31962, 61-1219048 and 62-127845. These disazo pigments all proved to have high sensitivity as well as high potential stability, and could be sufficiently useful. However, further higher sensitivity and durability have been demanded for copying machines in recent years which have been made higher in speed, and the disazo pigments as described above cannot be said to be satisfactory.

In addition, as the printer by use of electrophotographic system, etc. has been widely used for output of microcomputer, wordprocesser, etc., a longer wavelength light source such as LED, laser diode has been used, and a photosensitive member useful for these light sources has been required. Particularly, when a laser diode is used for the light source, since the oscillation wavelength region of the laser diode varies depending on the difference between individuals, the temperature used, the temperature elevation by oscillation. The photosensitive member used is demanded to have flat spectral sensitivity in the oscillation wavelength region of the laser diode.

Particularly, in a printer or color printer, where gradation is considered to be important, selection of laser diode and laser temperature controller are required for suppressing the change in oscillation wavelength when the spectral sensitivity is not flat, the cost of these printers will be disadvantageously increased. Also for this reason, flat spectral sensitivity has been required.

As flatness of spectral sensitivity, the sensitivity change at from 760 nm to 800 nm which is the center of the oscillation wavelength region of laser diode is required to be within 0 to 15%, particularly desirably within 0 to 10%.

As the wavelength elongation technique of the azo pigment so as to correspond to such laser diode oscillation wavelength retion, the present Applicant has previously reported use of a specific coupler residue in Japanese Patent Laid-open Application No. 62-147463. However, the disazo pigment having benzanthrone within the molecule as disclosed in Japanese Patent Laid-open Application No 62-147463 has the change in spectral sensitivity at 760 nm to 800 nm of 20% at minimum, which cannot be said to be satisfactory, leaving room for improvement.

SUMMARY OF THE INVENTION

An object of the present invention is to provide a sufficient high sensitivity and flatness of spectral sensitivity in the laser diode oscillation wavelength region in an electrophotographic photosensitive member of the lamination type having at least two layers of the charge generation layer and the charge transport layer provided thereon.

Another object of the present invention is to provide an electrophotographic photosensitive member which can maintain the potential during repeated uses stably and exhibit stable potential characteristics and image characteristics which are not dependent on the use environment (temperature, humidity).

A further object of the present invention is to provide an electrophotographic photosensitive member which is stable to ozone, NOx, nitric acid, etc generated by corona discharging.

The present Applicant has investigated in detail about benzanthrone type disazo pigments, and consequently found that benzanthrone type disazo pigments of specific structures can accomplish sufficient high sensitization and flatness of spectral sensitivity in the longer wavelength region.

The present invention is an electrophotographic photosensitive member having a charge generation layer and a charge transport layer on an electroconductive support, characterized in that the charge generation layer has at least one of disazo pigments represented by the formulae (1) and (2):

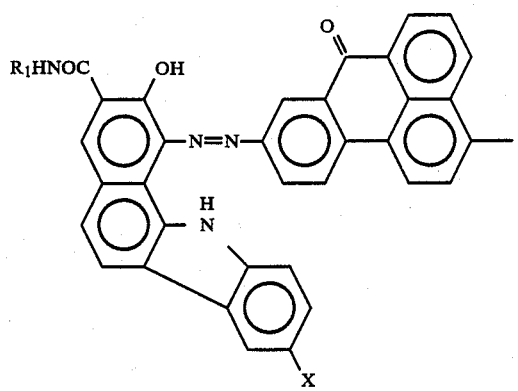

Formula (1)

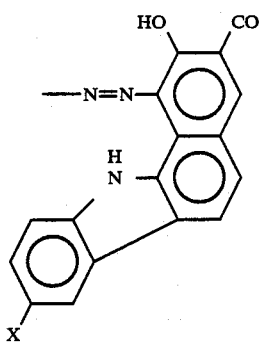

Formula (2)

wherein $R_1$ and $R_2$ each represent a group selected from the group consisting of:

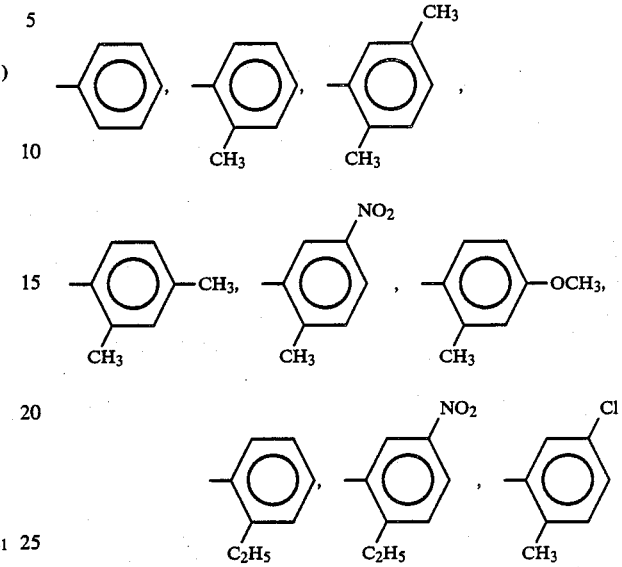

and X represents halogen atom such as fluorine, chlorine, bromine, iodine, etc.

DETAILED DESCRIPTION OF THE INVENTION

Figure 1:
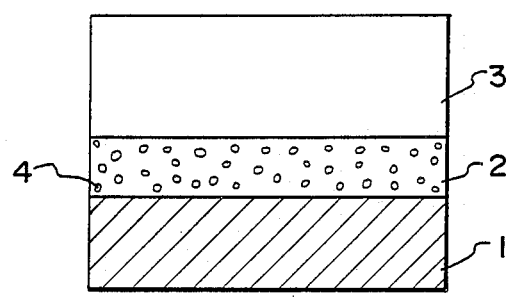
FIG. 1 shows the basic constitution of the laminated layer type electrophotographic photosensitive member of the present invention.

As shown in FIG. 1, the electrophotographic photosensitive member of the present invention has a basic constitution, in which charge generation layer 2 and charge transport layer 3 are laminated on conductive support 1. Charge generation layer 2 contains a dibenzanthrone type disazo pigment as charge generating substance 4.

It is conjectured that sufficient high sensitization and flatness of spectral sensitivity in the longer wavelength region, which are accomplished by the benzanthrone type disazo pigments in the present invention, result from the structure of the coupler portion in the benzanthrone type disazo pigment. That is, it is considered that the pigment molecules are overlapped and the orientation property is improved by the X substituent in Formula (1) and the benzcarbazole group in Formula (2). Further, it is considered that by specifying a substituent in a carbamoyl group, a distance of the pigment molecules on the carrier generation site becomes exactly appropriate for a generation of a carrier to improve a carrier generation efficiency.

In the following, specific examples of benzanthrone type disazo pigments which are charge generating substances of the present invention are shown.

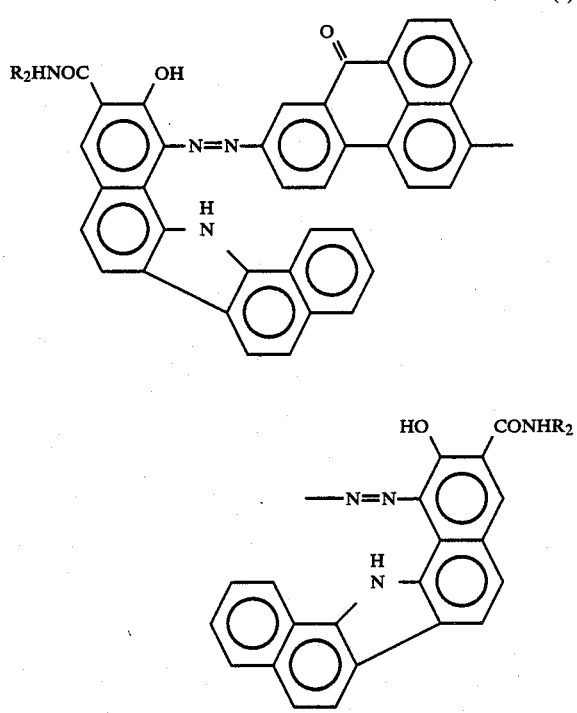

Formula (1)
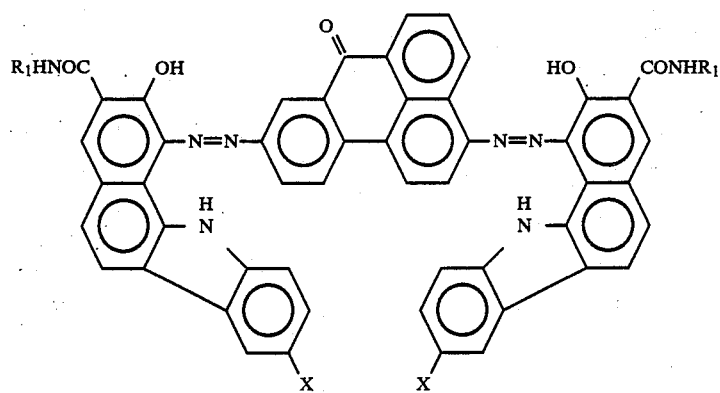
TABLE 1
| Pigment No. | R₁ | X |
|---|---|---|
| G-1 | phenyl | F |
| G-2 | " | Cl |
| G-3 | " | Br |
| G-4 | " | I |
| G-5 | 3-methylphenyl | F |
| G-6 | " | Cl |
| G-7 | " | Br |
| G-8 | " | I |
| G-9 | 3,4-dimethylphenyl | F |
| G-10 | " | Cl |
| G-11 | " | Br |
| G-12 | " | I |
| G-13 | 3,5-dimethylphenyl (with CH₃ groups) | F |
| G-14 | " | Cl |
| G-15 | " | Br |
| G-16 | " | I |
| G-17 | 3,4-dimethyl-5-NO₂-phenyl | F |
| G-18 | " | Cl |
| G-19 | " | Br |
| G-20 | " | I |
| G-21 | 3,5-dimethyl-4-OCH₃-phenyl | F |
| G-22 | " | Cl |
| G-23 | " | Br |
| G-24 | " | I |
| G-25 | 3-ethyl-5-methylphenyl | F |
| G-26 | " | Cl |
| G-27 | " | Br |
| G-28 | " | I |
| G-29 | 3-ethyl-5-methyl-4-NO₂-phenyl | F |
| G-30 | " | Cl |
| G-31 | " | Br |
| G-32 | " | I |
| G-33 | 3-methyl-5-chlorophenyl | F |
| G-34 | " | Cl |
| G-35 | " | Br |
| G-36 | " | I |

Formula (2)

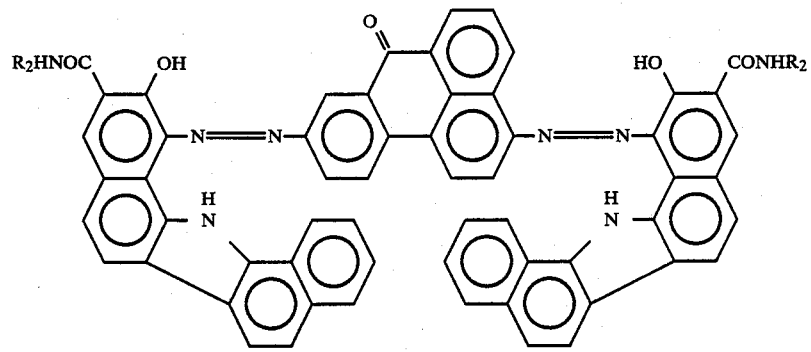

Further, as the charge transporting substance to be contained in the charge transport layer 3 in the present invention, styryl compounds selected from the following formulae (3) and (4) are particularly preferred.

Formula

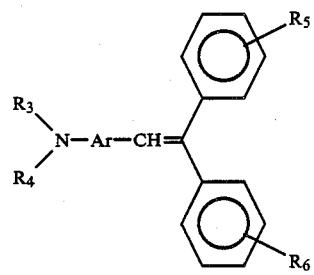

-continued

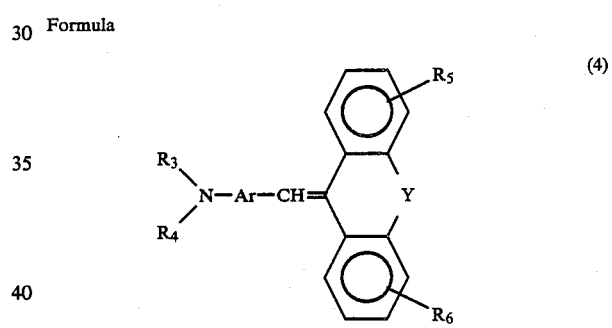

TABLE 2

| Pigment No. | $R_2$ | Pigment No. | $R_2$ |
|---|---|---|---|
| G-37 | phenyl | G-42 | 3-methyl-4-methoxyphenyl |
| G-38 | 3-methylphenyl | G-43 | 2-ethylphenyl |
| G-39 | 2,5-dimethylphenyl | G-44 | 4-nitro-2-ethylphenyl |
| G-40 | 3,4-dimethylphenyl | G-45 | 2-chloro-4-methylphenyl |
| G-41 | 3-nitro-4-methylphenyl | | |

In the formula (4), Y represents a single bond, —CH$_2$—CH$_2$— or —CH=CH—, $R_3$ and $R_4$ in the formula (3) and the formula (4) each represent alkyl, aralkyl, aromatic cyclic or heterocyclic group, specifically, alkyl group such as methyl, ethyl, propyl or the like, aralkyl group such as benzyl, phenethyl, naphthylmethyl or the like, aromatic cyclic group such as phenyl, naphthyl or the like, or heterocyclic group such as pyridyl, quinonyl, thienyl, furyl or the like. These alkyl, aralkyl, aromatic cyclic, and heterocyclic groups may also have substituents including, for example, alkyl groups such as methyl, ethyl, propyl and the like, alkoxy groups such as methoxy, ethoxy, propoxy and the like, halogen atoms such as fluorine, chlorine, bromine and the like or nitro group, etc.

$R_5$ and $R_6$ each represent hydrogen atom, alkyl group, alkoxy group or halogen atom. Specific examples of alkyl group, alkoxy group and halogen atom are the same as mentioned above. Also, the alkyl group and the alkoxy group may have substituents as mentioned above.

Ar represents an aromatic cyclic group or heterocyclic group, specifically aromatic cyclic group such as phenyl, naphthyl, etc., heterocyclic group such as pyridyl, quinonyl, thienyl, furyl, etc. The aromatic cyclic group and the heterocyclic group may also have substituents. Examples of the substituents which may be possessed by Ar may include alkyl groups such as methyl, ethyl, propyl and the like, alkoxy groups such as methoxy, ethoxy, propoxy and the like, halogen atoms such as fluorine, chlorine, bromine and the like or nitro group.

Specific examples of the charge transporting substance to be used in the present invention are shown below.

Charge transporting substances:

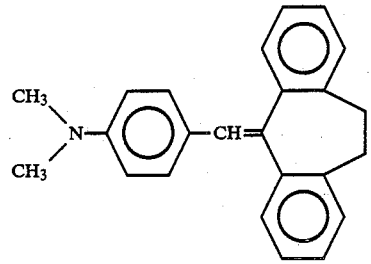
T-1

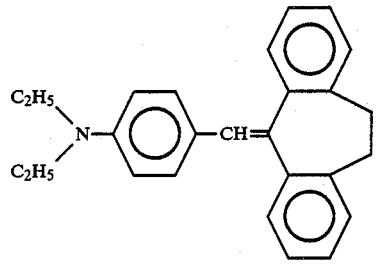
T-2

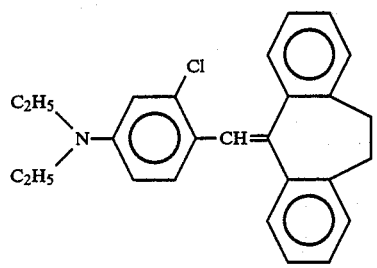
T-3

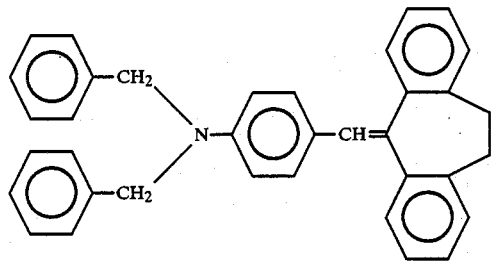
T-4

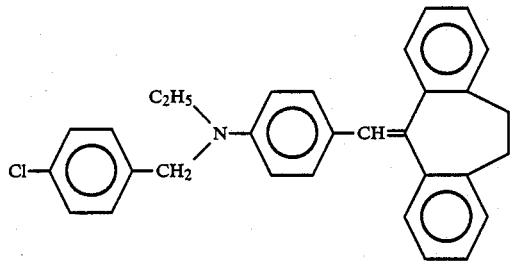
T-5

-continued
T-6
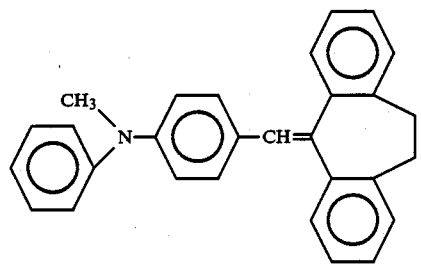
T-7
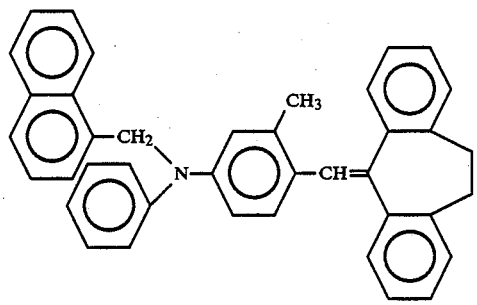
T-8
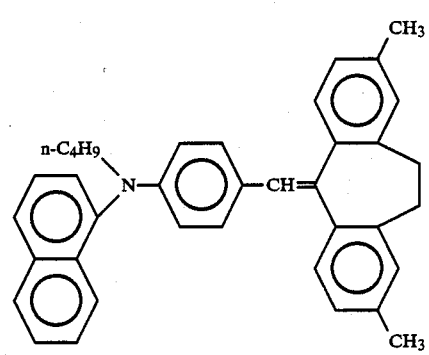
T-9
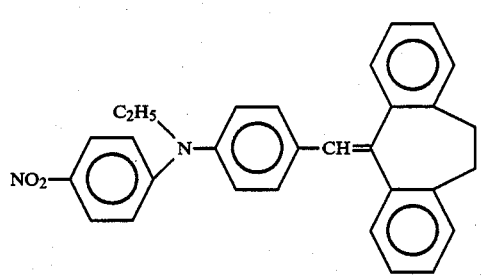
T-10
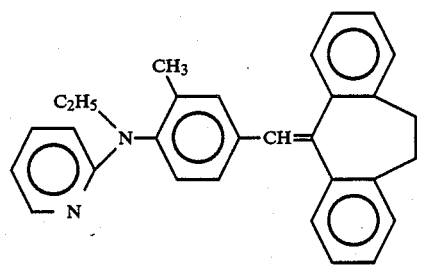

T-11
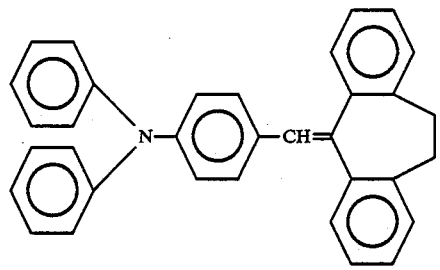
T-12
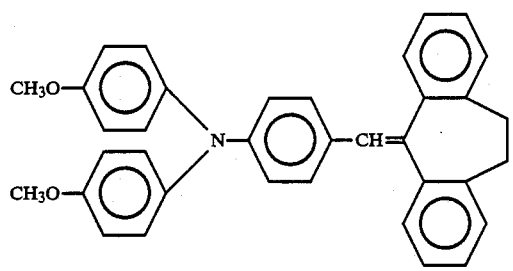
T-13
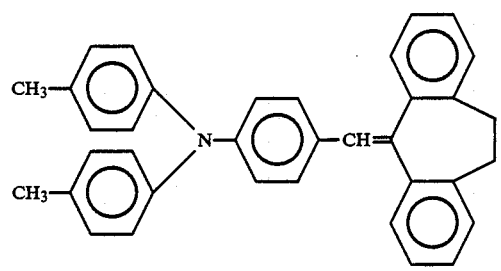
T-14
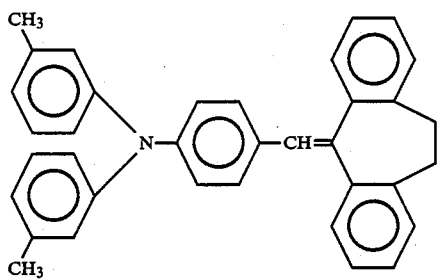
T-15
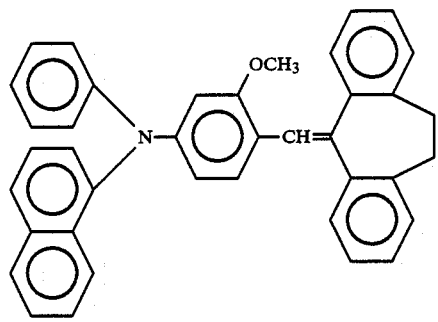

-continued
T-16
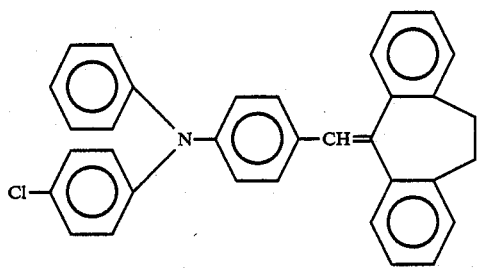
T-17
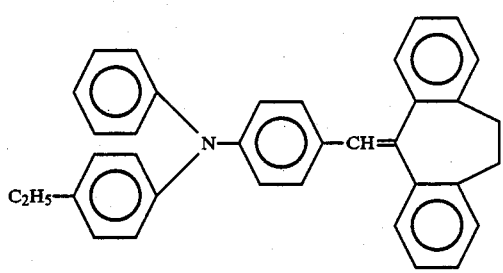
T-18
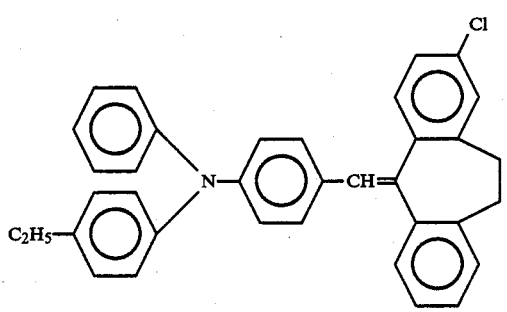
T-19
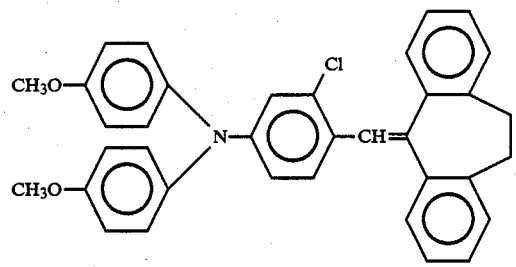
T-20
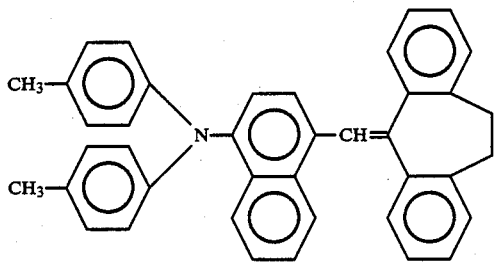

-continued
T-21
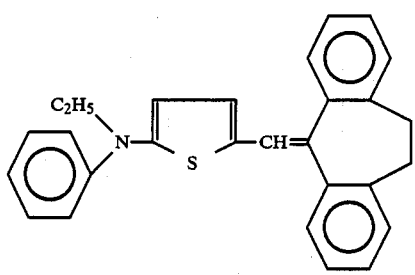
T-22
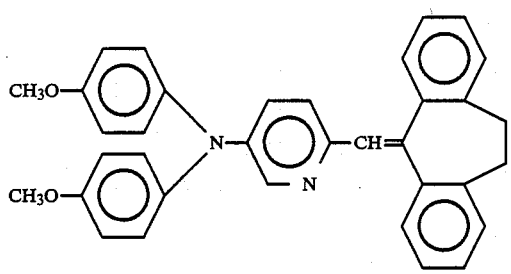
T-23
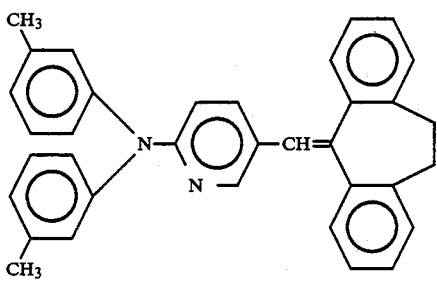
T-24
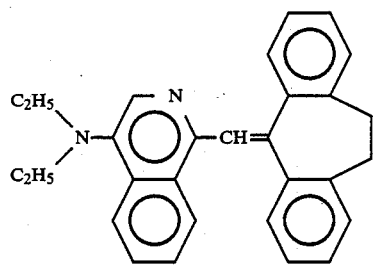
T-25
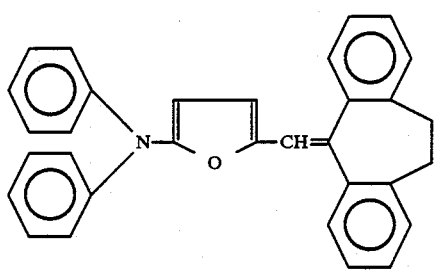

-continued
T-26
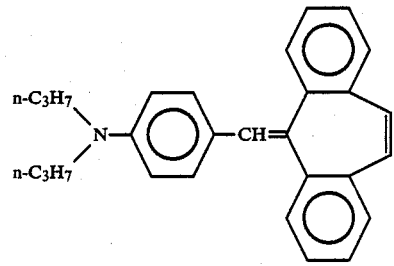
T-27
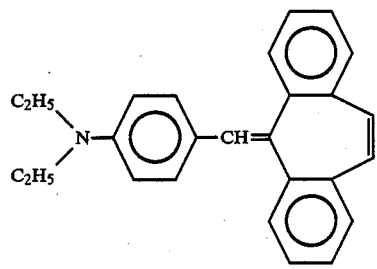
T-28
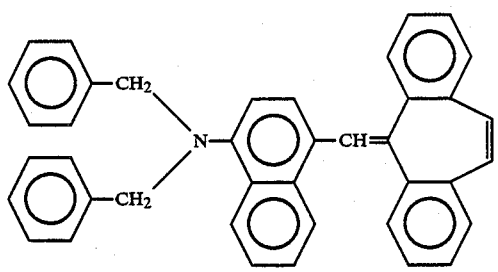
T-29
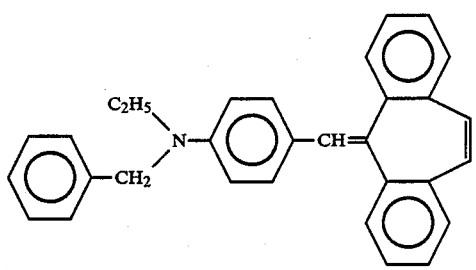
T-30
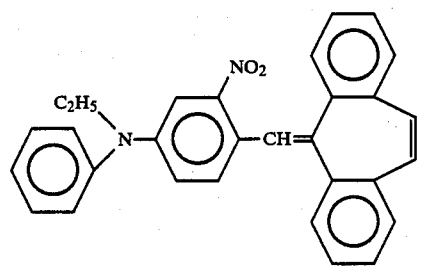
T-31
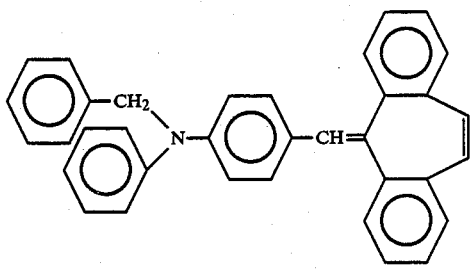

T-32
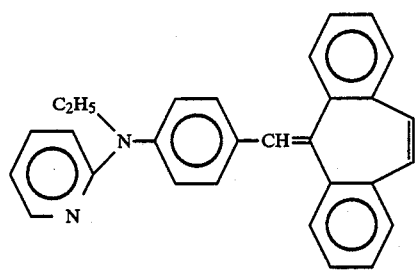
T-33
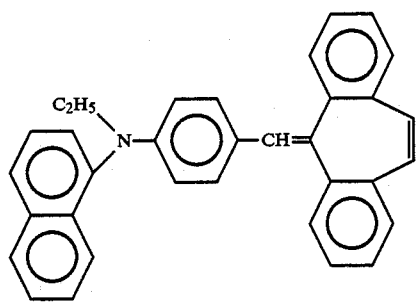
T-34
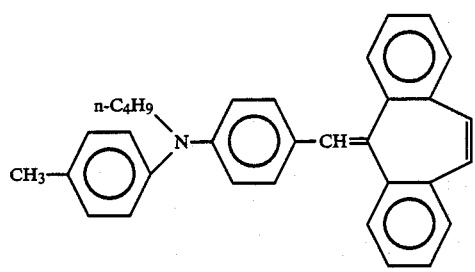
T-35
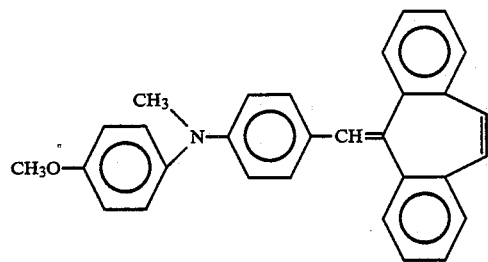
T-36
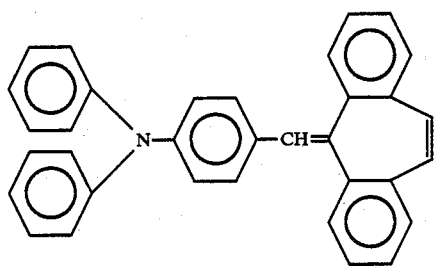

-continued
T-37
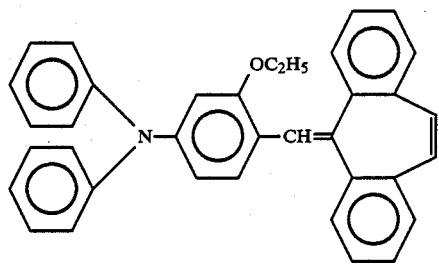
T-38
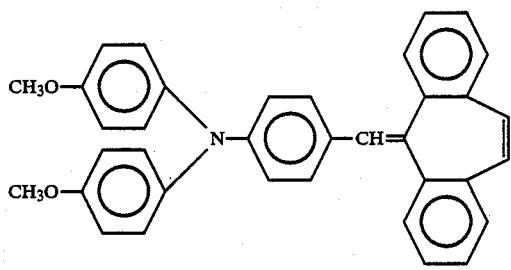
T-39
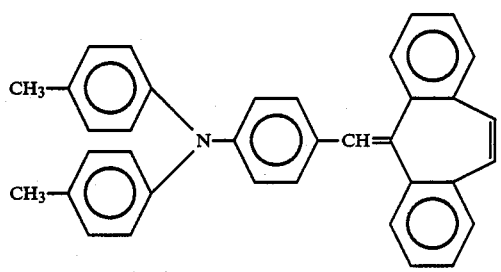
T-40
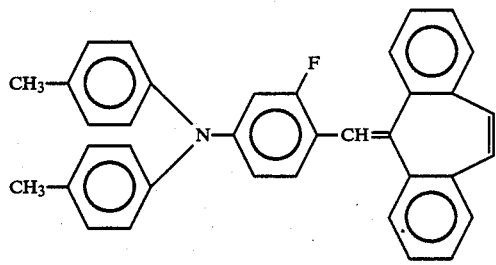
T-41
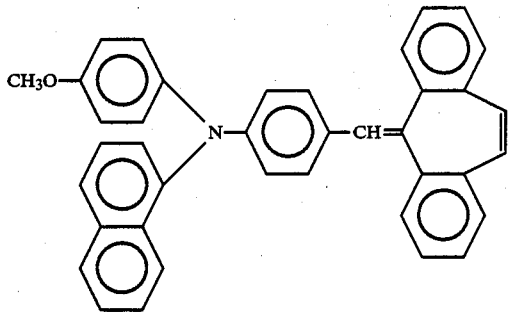

-continued
T-42
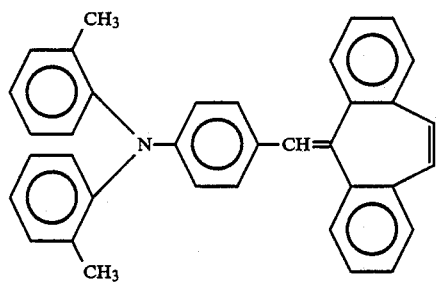
T-43
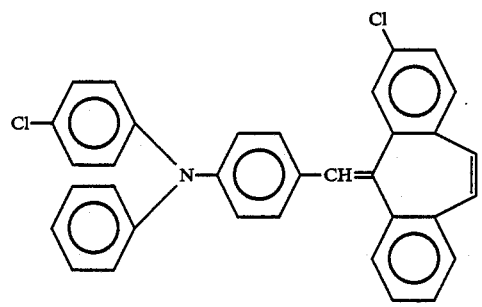
T-44
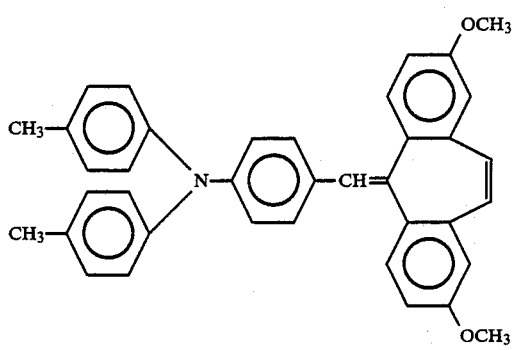
T-45
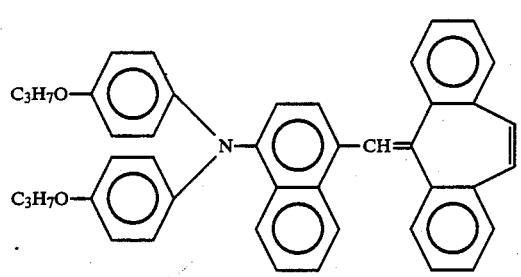
T-46
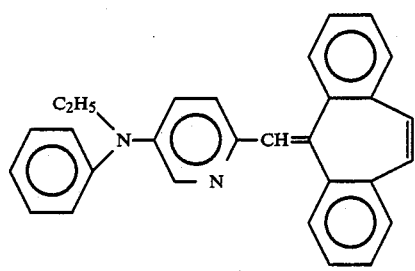

-continued
T-47
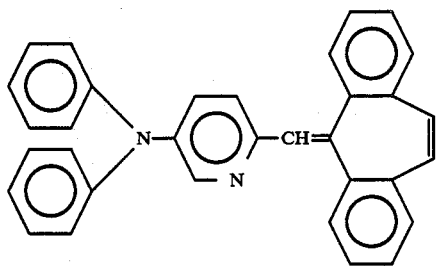
T-48
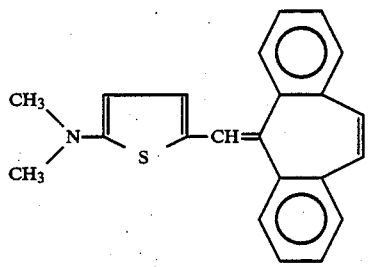
T-49
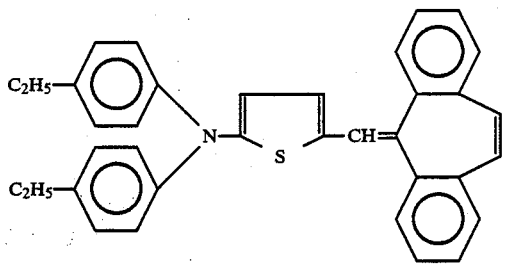
T-50
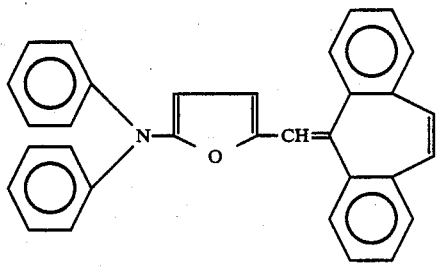
T-51
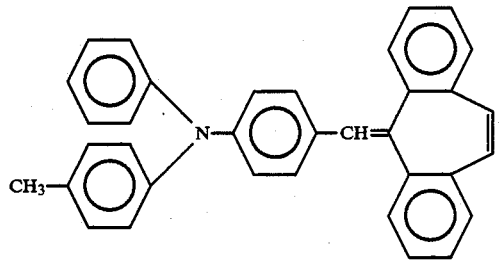
T-52
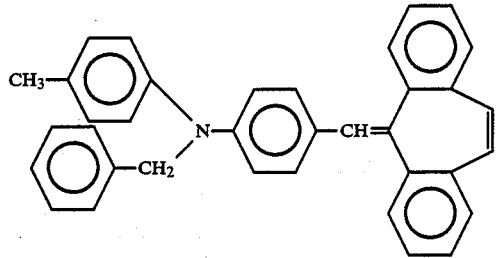

-continued
T-53
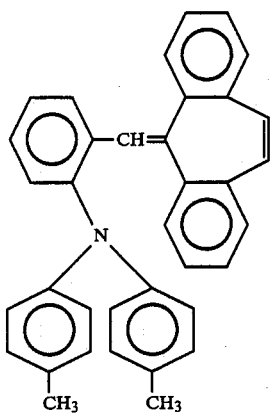
T-54
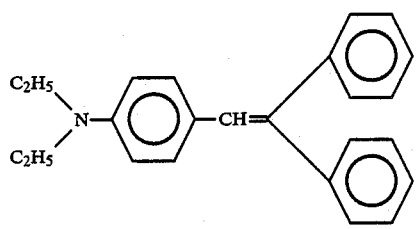
T-55
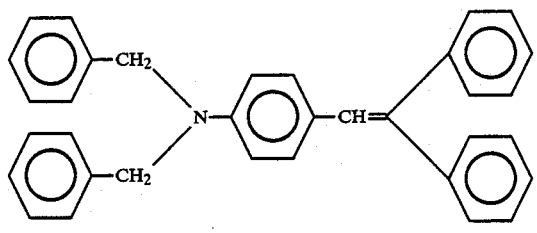
T-56
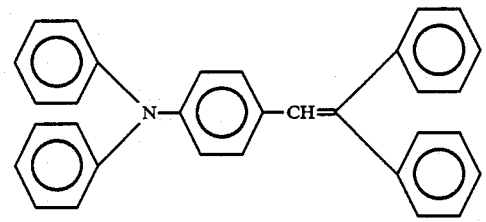
T-57
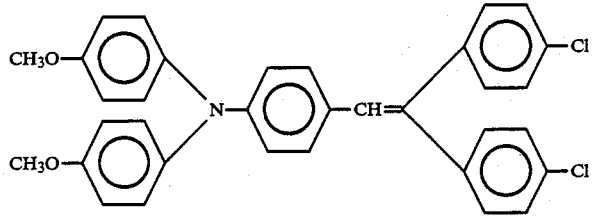
T-58
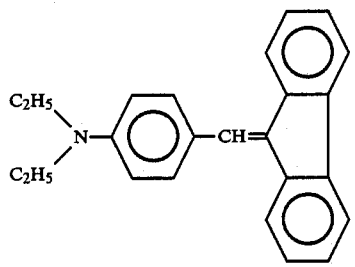

T-59
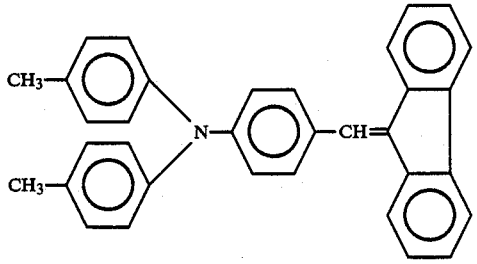

T-60
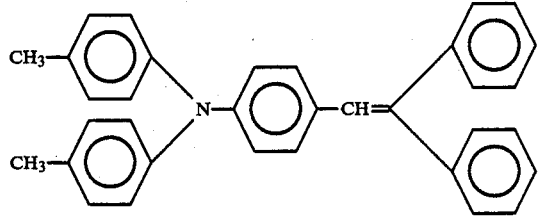

T-61
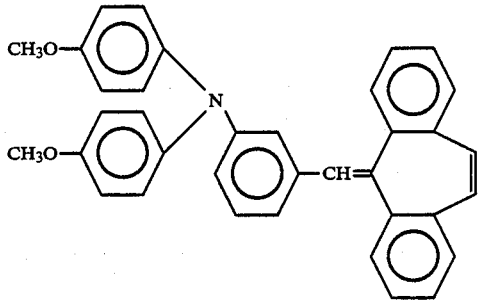

T-62
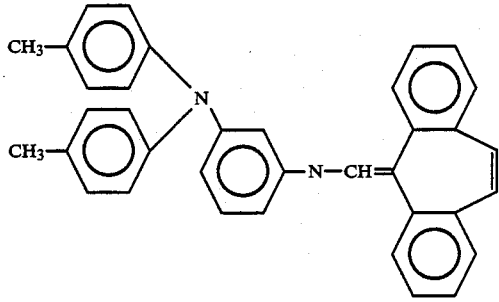

T-63
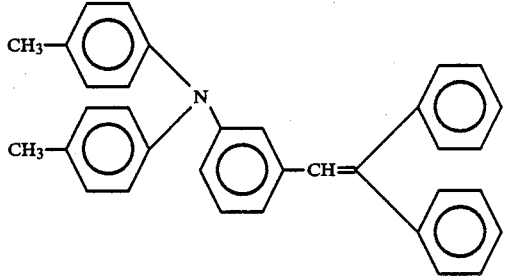

The styryl compounds as described above are charge transporting substances which can exhibit particularly excellent effect by combination with the charge generating substance of the present invention, but other than these styryl compounds, the following charge transporting substances can also be used. Specifically, there may be included hydrazone compounds such as N-methyl-N-phenylhydrazino-3-methylidene-9-ethylcarbazole, N,N-diphenylhydrazino-3-methyligene-9-ethylcarbazole, p-diethylaminobenzaldehyde-N-α-naphthyl-N-phenylhydrazone and the like; pyrazoline compounds such as 1-phenyl-3-(p-diethylaminostyryl)-5-(p-diethylaminophenyl)pyrazoline and the like; arylamine compounds such as N,N'-diphenyl-N,N'-bis(3,5-dimethoxyphenyl)-(4,4'-biphenyl)-1,1'-diamine, N,N-diethyl-N',N'-diphenyl-(4,4'-biphenyl)-1,1'-diamine and the like oxazole compounds such as 2-(p-diethylaminostyryl)-6-diethylaminobenzoxazole; triarylmethane compounds; and so on.

In the following, the present invention is described in more detail.

The charge generation layer in order to obtain sufficient absorbance should preferably contain as much charge generating substance exhibiting photoconductivity as described above, and be made a thin film layer having a film thickness of, for example, 8 µm or less, preferably 0.01 µm to 1 µm, in order to make the flight distance of the charge carriers generated shorter. This is due to the fact that most of the incident light dose is absorbed in the charge generation layer to form much charge carriers, and further that the charge carriers generated are required to be injected into the charge transport layer without deactivation by recombination or trap. The charge generating substance as described above may be also used as a mixture of two or more kinds. Further, within the range which does not lower the characteristics of the charge generating substance of the present invention, other charge generating substance may be also mixed.

The charge generating layer can be formed by dispersing the charge generating substance as described above in an appropriate binder and coating the dispersion on a support, or alternatively can be obtained by forming a vapor deposited film by means of a vacuum vapor deposition device.

The binder which can be used during formation of the charge generation layer by coating can be selected from a wide scope of insulating resins, and also can be selected from organic photoconductive polymers such as poly-N-vinylcarbazole, polyvinylanthracene, polyvinylpyrene, etc. Preferably, there can be included insulating resins such as polyvinylbutyral, polyarylate, polycarbonate, polyester, phenoxy resin, polyvinyl acetate, acrylic resin, polyacrylamide resin, polyamide, polyvinylpyridine, cellulosic resin, urethane resin, epoxy resin, casein, polyvinyl alcohol, polyvinylpyrrolidone, etc. The resin to be incorporated in the charge generation layer may be suitably 80% by weight or less, preferably 40% by weight or less.

The solvent for dissolving these resins depends on the kind of the resin, and should preferably be selected from those which do not dissolve the charge transport layer and the subbing layer as described below. Specific examples of organic solvents may include alcohols such as methanol, ethanol, isopropanol and the like; ketones such as acetone, methyl ethyl ketone, cyclohexanone and the like; amides such as N,N-dimethylformamide, N,N-dimethylacetamide and the like; sulfoxides such as dimethyl sulfoxide and the like; ethers such as tetrahydrofuran, dioxane, ethylene glycol monomethyl ether and the like; esters such as methyl acetate, ethyl acetate and the like; aliphatic halogenated hydrocarbons such as chloroform, methylene chloride, dichloroethylene, carbon tetrachloride, trichloroethylene and the like; or aromatics such as benzene, toluene, xylene, ligroin, monochlorobenzene, dichlorobenzene and the like.

Coating can be practiced by use of such coating methods as dip coating, spray coating, Meyer bar coating, blade coating, etc. Drying should preferably be conducted by finger touch drying at room temperature, followed by heating drying. Heating drying can be performed stationarily or under air stream at a temperature of 30° to 200° C. for a time in the range from 5 minutes to 2 hours.

The charge transport layer is electrically connected to the charge generation layer as described above, receives the charge carriers injected from the charge generation layer in the presence of an electrical field, and also has the function capable of transporting these charge carriers to the surface. The charge transport layer may be laminated on the charge generation layer or laminated therebeneath.

The charge transport layer is formed by dissolving and coating the charge transporting substance as described above together with a suitable binder.

The resin available as the binder may include, for example, insulating resins such as acrylic resin, polyarylate, polyester, polycarbonate, polystyrene, acrylonitrile styrene copolymer, acrylonitrile-butadiene copolymer, polyvinylbutyral, polyvinylformal, polysulfone, polyacrylamide, chlorinated rubber, etc., or organic photoconductive polymers such as poly-N-vinylcarbazole, polyvinylanthracene, polyvinylpyrene, etc.

The charge transport layer is limited in the ability to transport charge carriers, and therefore cannot be made thicker than is necessary. Generally, the film thickness may be 5 µm to 35 µm, but the preferred range is 8 µm to 30 µm. In forming the charge transport layer by coating, a suitable coating method as mentioned above can be used.

The photosensitive layer comprising the laminated structure of such charge generation layer and charge transport layer is provided on an electroconductive support. As the electroconductive support, there can be used one of which the support itself has electroconductivity, for example, aluminum, aluminum alloy, titanium, nickel, etc., otherwise plastic having a layer formed by coating of aluminum, aluminum alloy, indium oxide, tin oxide, indium oxide tin oxide alloy, etc. by the vacuum vapor deposition method, a support having electroconductive particles (e.g. titanium oxide, carbon black, silver particles, etc.) coated together with an appropriate binder on the above electroconductive support or plastic, a plastic having a support or paper impregnated with electroconductive particles, a plastic having an electroconductive polymer, etc.

It is also possible to provide a subbing layer having the barrier function and the adhesion function between the electroconductive support and the photosensitive layer. The subbing layer can be formed of casein, polyvinyl alcohol, nitrocellulose, ethyleneacrylic acid copolymer, polyamide, polyurethane, gelatin, aluminum oxide, etc.

The subbing layer should suitably have a film thickness of 0.1 µm to 6 µm, preferably 0.6 µm to 3 µm.

Also, the electrophotographic photosensitive member of the present invention may also have a covering layer or an intermediate layer for such purposes as protection, improvement of adhesiveness, improvement of carrier generation, transport and injectability, etc.

The electrophotographic photosensitive member of the present invention can fully realize its performance by using it in laser diode, digital copying machine, etc., but is also widely utilizable in the field of electrophotography application such as LED printer, liquid crystal printer, laser printing plate, etc.

The present invention is described below by referring to Examples.

EXAMPLE 1

On an aluminum plate, a subbing layer comprising a vinyl chloride-maleic anhydride-vinyl acetate copolymer with a thickness of 0.1 μm was provided.

Next, 5 g of the above exemplary disazo pigment (G-26) was added into a solution of 2 g of a butyral resin (butyral formation degree 63 mol %, number average molecular weight 20,000) dissolved in 95 ml of cyclohexanone and dispersed in a sand mill for 20 hours. The dispersion was coated by Meyer bar to a film thickness after drying of 0.5 μm on the subbing layer previously formed, followed by drying to form a charge generation layer.

Next, 5 g of the above exemplary styryl compound (T-39) and 5 g of a bisphenol Z type polycarbonate resin (viscosity average molecular weight 30,000) were dissolved in 70 ml of chlorobenzene, and the solution was coated by Meyer bar on the charge generation layer to a film thickness after drying of 22 μm to form a charge transport layer, thus preparing a photosensitive member No. 1.

The thus prepared electrophotographic photosensitive member wa subjected to corona charging of −5.5 KV according to the static system by use of an electrostatic copying paper testing device Model SP-428 produced by Kawaguchi Denki K.K., maintained in a dark place for 1 sec., then exposed to light by a halogen lamp with an illuminance of 2 lux. and the charging characteristics were examined. As the charging characteristics, the surface potential ($V_0$) and the exposure dosage ($E\frac{1}{2}$) necessary for decaying the potential during dark decay for one sec. ($V_D$) to $\frac{1}{2}$ were measured.

The results are shown below.

$V_o$: −720 V
$V_D$: −700 V
$E\frac{1}{2}$: 0.6 lux.sec

Figure 2:
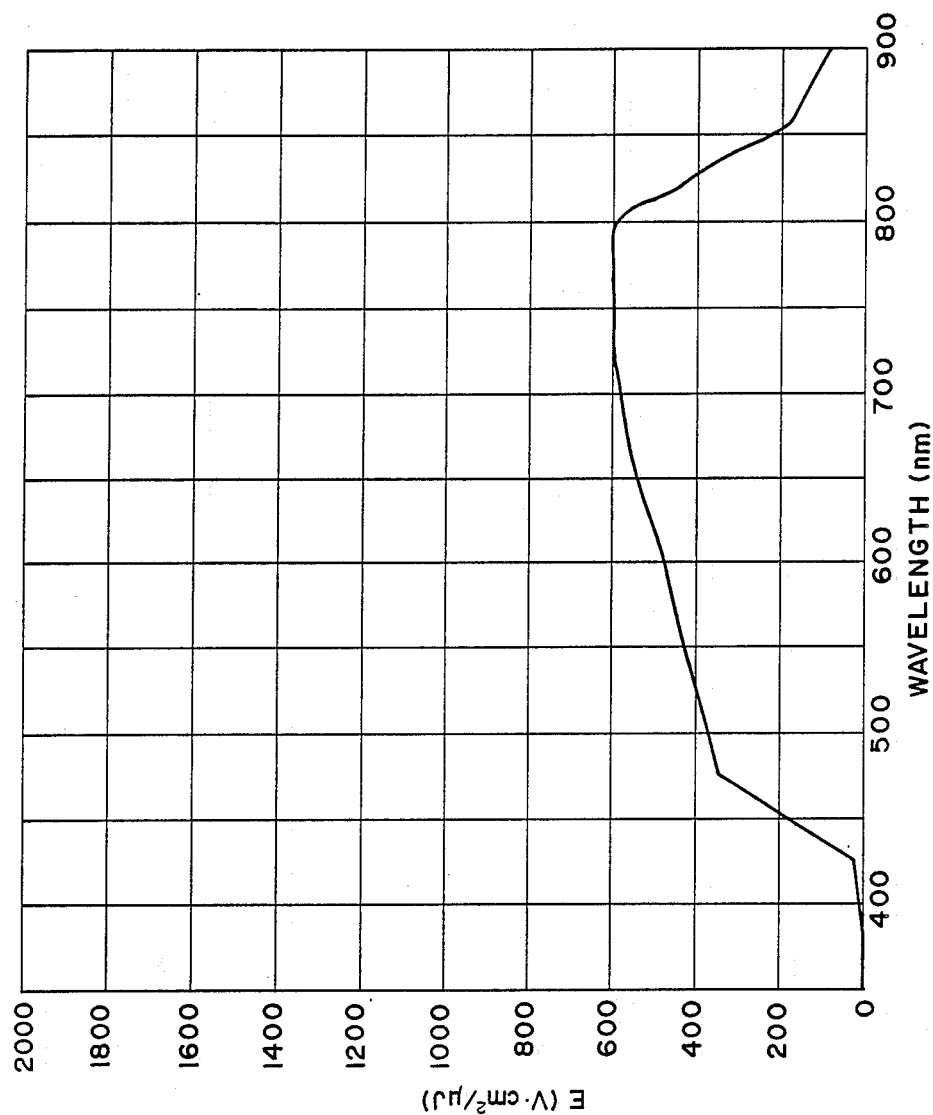
FIG. 2 shows the spectral sensitivity spectrum of th electrophotographic photosensitive member of the present invention.

Next, spectral sensitivity was measured by use of a monochromatic light of an optical density of 1 μw/cm² for the light source of the above electrostatic copying paper testing device. Sensitivity was measured by measuring the exposure dosage EΔ 500V (μJ/cm²) necessary for the surface potential ($V_D$) which was made −700 V to become 200 V, calculating:

$$E(V \cdot cm^2/\mu J) = \frac{500 \, (V)}{E\Delta 500 \, V(\mu J/cm^2)}$$

and plotting it versus wavelength. The results are shown in FIG. 2.

Further, the photosensitive member was attached to the cylinder of an electrophotographic copying machine equipped with a corona charger of −5.6 KV, an exposure optical system, a developing instrument, a transfer charger, a deelectrifying exposure optical system and a cleaner and the image characteristics were examined. Evaluation of the image characteristics by use of the copying machine was performed under the three environments of a humidity of 10% and a temperature of 5° C., a humidity of 50% and a temperature of 18° C., a humidity of 80% and a temperature of 35° C., respectively. In all the environments, good images faithful to original could be obtained. The images were free from blurring, vagueness, etc. even after successive copying for 10,000 sheets. Thus, the present photosensitive member was found to exhibit good image characteristics.

When the sensitivity change ΔE=E (800 nm)/E (770 nm) from 770 to 800 nm which is the laser oscillation wavelength retion of the present photosensitive member was measured, it was found to be very small as ΔE=0.98. Spectral sensitivity is more flat as the value of ΔE is more approximate to 1.

COMPARATIVE EXAMPLES 1, 2 AND 3

Photosensitive members were prepared in entirely the same manner as in Example 1 except for using the comparative disazo pigments (1), (2) and (3) shown below described in Japanese Patent Laid-open Application No. 62-147463 to provide comparative photosensitive members No. 1, No. 2 and No. 3, and the charging characteristics thereof were examined in the same manner as in Example 1. The results are shown in Table 3.

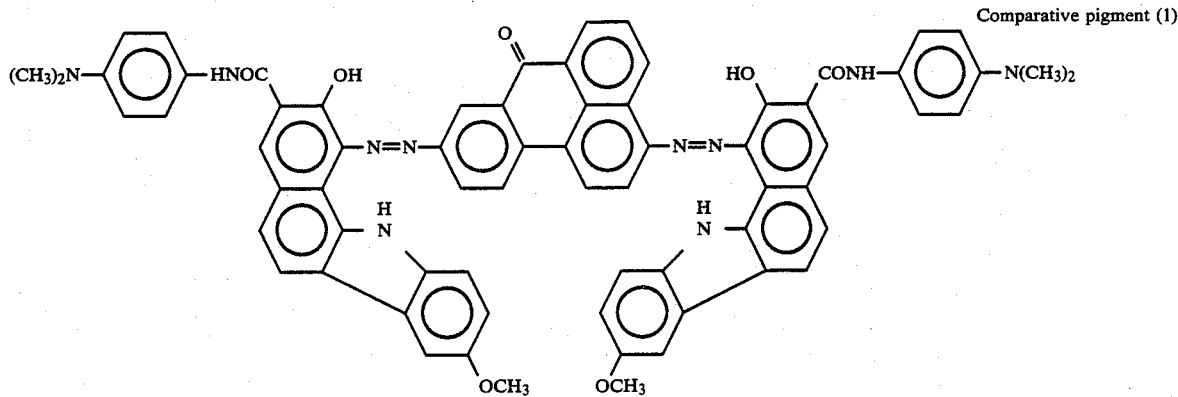

Comparative pigment (1)

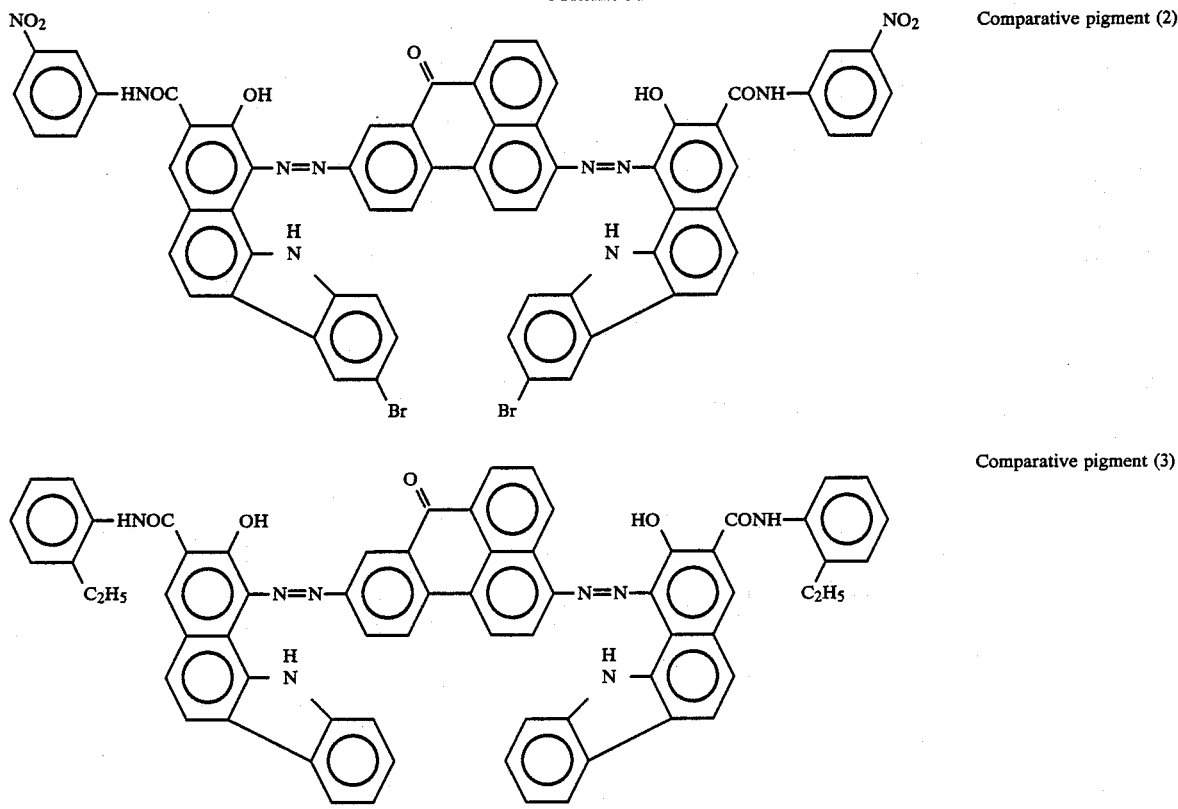

Comparative pigment (2)

Comparative pigment (3)

TABLE 3

| Comparative Example | Comparative Photosensitive member No. | Comparative pigment | $V_O$ (V) | $V_D$ (V) | $E_{\frac{1}{2}}$ (lux · sec) | $\Delta E$ |
|---|---|---|---|---|---|---|
| 1 | 1 | (1) | −600 | −570 | 1.0 | 0.80 |
| 2 | 2 | (2) | −620 | −600 | 0.70 | 0.75 |
| 3 | 3 | (3) | −610 | −590 | 3.6 | 0.6 |

From the above results, the electrophotographic photosensitive member of the present invention was found to be highly sensitive and exhibit a flat spectral sensitivity in the laser diode oscillation wavelength region.

In electrophotographic copying machine, the surface potential at 800 nm of the same dosage became as shown below when the dark portion potential ($V_D$) was set at −700 V and the dosage of the laser diode was set so that the light portion potential ($V_L$) became −200 V at 760 nm. Thus, it can be appreciated that the photosensitive member of the present invention is a photosensitive member very excellent in image characteristics with little fluctuation of the contrast potential even when the laser oscillation wavelength may change.

| | $V_{L\,(800nm)}$ | $\Delta V_L\,|VL_{800nm}-VL_{760nm}|(V)$ |
|---|---|---|
| Photosensitive Member No. 1 | −210 V | 10 |
| Comparative Photosensitive Member No. 1 | −300 V | 100 |
| Comparative Photosensitive Member No. 2 | −325 V | 125 |
| Comparative | −400 V | 200 |

-continued

| | $V_{L\,(800nm)}$ | $\Delta V_L\,|VL_{800nm}-VL_{760nm}|(V)$ |
|---|---|---|
| Photosensitive Member No. 3 | | |

EXAMPLE 2

A photosensitive member No. 2 was prepared in entirely the same manner as in Example 1 except for using the above exemplary disazo pigment G-41, and the charging characteristic $\Delta E$ was measured.

The results are shown below.
$V_O$: 700 V
$V_D$: −680 V
$E_{\frac{1}{2}}$: 0.8 lux.sec
$\Delta E$: 1

COMPARATIVE EXAMPLE 4

A photosensitive member was prepared in entirely the same manner as in Example 1 except for using the following comparative disazo pigment described in Japanese Patent Laid-open No. 62-147463 to provide Comparative example (4), and the charging characteristic $\Delta E$ was measured.

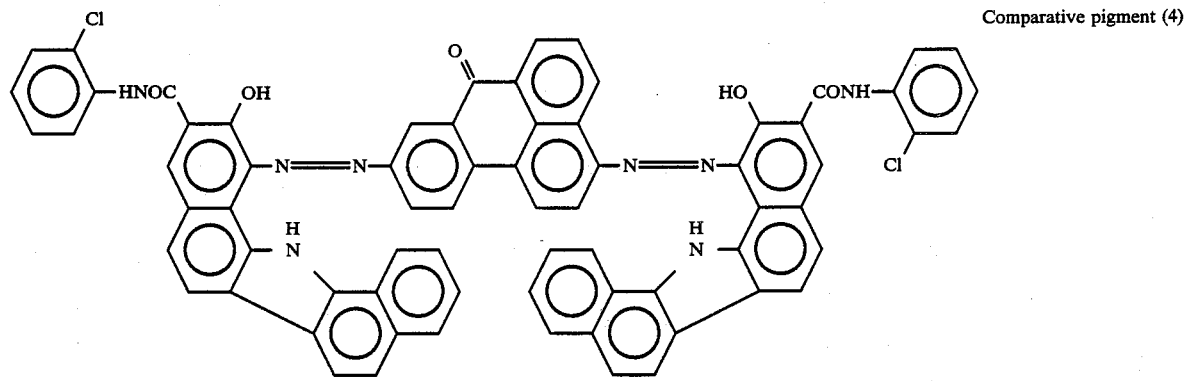

Comparative pigment (4)

The results are shown below.
$V_O$: 680 V
$V_D$: 640 V
$E_{\frac{1}{2}}$: 1.8 lux.sec
$\Delta E$: 0.5

From the above results, it can be appreciated that the electrophotographic photosensitive member of the present invention is highly sensitive and exhibits flat spectral sensitivity in the laser diode oscillation wavelength region.

EXAMPLES 3–48

The above exemplary disazo pigments and styryl compounds were combined as shown in Table 4, and photosensitive members were prepared as described in Example 1.

The photosensitive member was attached to the cylinder of an electrophotographic machine equipped with a corona charger, an exposure optical system, a developing instrument, a transfer charger, a deelectrifying exposure optical system and a cleaner.

The copying machine is constituted so as to give an image on a transfer paper with driving of the cylinder. By use of the copying device, the light portion potential ($V_L$) and the dark portion potential ($V_D$) were set at $-200$ V and $-700$ V, respectively, and the chanded amounts of $\Delta V_L$, $\Delta V_D$ of the light portion potential ($V_L{}^{10000}$) and the dark portion potential ($V_D{}^{10000}$) after used for 10,000 times were measured. The results are shown in Table 4.

TABLE 4

| Example | Photosensitive Member | Diazo Pigment No. | Styryl Compound No. | $\Delta V_D$ | $\Delta V_L$ |
|---|---|---|---|---|---|
| 3 | 3 | G-1 | T-39 | −6 | −6 |
| 4 | 4 | G-1 | T-60 | −5 | −6 |
| 5 | 5 | G-2 | T-39 | −5 | 0 |
| 6 | 6 | G-2 | T-60 | −6 | +2 |
| 7 | 7 | G-2 | T-62 | −3 | +2 |
| 8 | 8 | G-3 | T-39 | −10 | +5 |
| 9 | 9 | G-3 | T-60 | −5 | +2 |
| 10 | 10 | G-4 | T-39 | −10 | −10 |
| 11 | 11 | G-4 | T-60 | −9 | +2 |
| 12 | 12 | G-5 | T-39 | −21 | −10 |
| 13 | 13 | G-5 | T-13 | −10 | −5 |
| 14 | 14 | G-6 | T-39 | −11 | −8 |
| 15 | 15 | G-7 | T-39 | −9 | −9 |
| 16 | 16 | G-7 | T-2 | −2 | −1 |
| 17 | 17 | G-9 | T-39 | −12 | −9 |
| 18 | 18 | G-9 | T-63 | −10 | −8 |
| 19 | 19 | G-10 | T-39 | −10 | −10 |
| 20 | 20 | G-10 | T-60 | −9 | −8 |
| 21 | 21 | G-11 | T-39 | −9 | −10 |
| 22 | 22 | G-11 | T-54 | −3 | −2 |

TABLE 4-continued

| Example | Photosensitive Member | Diazo Pigment No. | Styryl Compound No. | $\Delta V_D$ | $\Delta V_L$ |
|---|---|---|---|---|---|
| 23 | 23 | G-14 | T-39 | −9 | −5 |
| 24 | 24 | G-18 | T-39 | −8 | −2 |
| 25 | 25 | G-18 | T-60 | −9 | −3 |
| 26 | 26 | G-19 | T-39 | −11 | −8 |
| 27 | 27 | G-19 | T-38 | −12 | −9 |
| 28 | 28 | G-22 | T-39 | −17 | −10 |
| 29 | 29 | G-25 | T-39 | −2 | −1 |
| 30 | 30 | G-25 | T-60 | −3 | −2 |
| 31 | 31 | G-26 | T-39 | −3 | 0 |
| 32 | 32 | G-26 | T-13 | −3 | +1 |
| 33 | 33 | G-26 | T-60 | −4 | −1 |
| 34 | 34 | G-26 | T-38 | −7 | −3 |
| 35 | 35 | G-26 | T-59 | −3 | +2 |
| 36 | 36 | G-26 | T-62 | −4 | −3 |
| 37 | 37 | G-26 | T-4 | −5 | −3 |
| 38 | 38 | G-27 | T-39 | −3 | +1 |
| 39 | 39 | G-30 | T-39 | −3 | −2 |
| 40 | 40 | G-34 | T-39 | −6 | −5 |
| 41 | 41 | G-37 | T-39 | −10 | −8 |
| 42 | 42 | G-37 | T-60 | −11 | −8 |
| 43 | 43 | G-38 | T-39 | −15 | −6 |
| 44 | 44 | G-43 | T-39 | −12 | −10 |
| 45 | 45 | G-44 | T-39 | −5 | −4 |
| 46 | 46 | G-44 | T-60 | −8 | −5 |
| 47 | 47 | G-45 | T-39 | −7 | −5 |
| 48 | 48 | G-45 | T-60 | −9 | −7 |

COMPARATIVE EXAMPLES 5–7

By use of comparative photosensitive members No. 2 and No. 4, $\Delta V_L$ and $\Delta V_D$ were measured in the same manner as in Example 3.

TABLE 5

| Comparative Example | Comparative Photosensitive Member No. | Comparative Pigment | $\Delta V_D$ | $\Delta V_L$ |
|---|---|---|---|---|
| 5 | 1 | 1 | −50 | +25 |
| 6 | 2 | 2 | −35 | −5 |
| 7 | 4 | 4 | −40 | +10 |

From the results in Table 4 and Table 5, it can be seen that the photosensitive member according to the present invention is further less in potential fluctuation during repeated uses.

EXAMPLES 49–51

Photosensitive members No. 49, No. 50 and No. 51 were prepared in the same manner as in Example 1 except for using the compounds H-1, H-2, H-3 having the structures shown below in place of the styryl compound in Example 1, and their charging characteristics were measured. Also, the potential fluctuation amounts were measured in entirely the same manner as in Example 3.

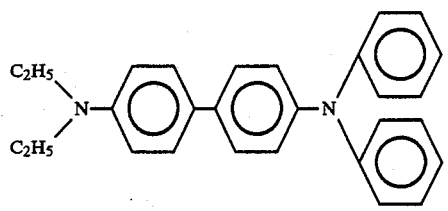
H-1

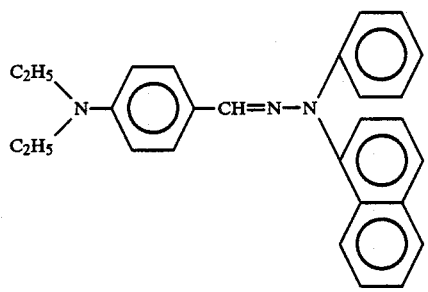
H-2

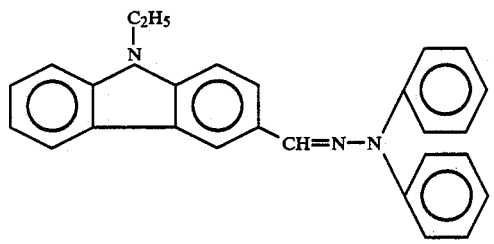
H-3

The results are shown in Table 6.

TABLE 6

| Example | Photo-sensitive member | Charge transport substance | $V_O$ (V) | $V_D$ (−V) | $E_{\frac{1}{2}}$ (lux · sec) | $\Delta V_D$ | $\Delta V_L$ |
|---|---|---|---|---|---|---|---|
| 49 | 49 | H-1 | −700 | −660 | 0.8 | −20 | +10 |
| 50 | 50 | H-2 | −730 | −690 | 0.8 | −25 | +5 |
| 51 | 51 | H-3 | −710 | −680 | 0.7 | −30 | +8 |

COMPARATIVE EXAMPLES 8–10

Comparative photosensitive member No. 5, No. 6 and No. 7 were prepared in entirely the same manner as in Example 1 by use of the charge generating substances used in Comparative examples 1, 2 and 4 and the charge transporting substances used in Examples 49–51, and their charging characteristics and the potential fluctuation amounts were measured. The results are shown in Table 7.

TABLE 7

| Comparative Example | Comparative Photosensitive member | Comparative Pigment | Charge-transport Substance | $V_O$ (V) | $V_D$ (−V) | $E_{\frac{1}{2}}$ (lux · sec) | $\Delta V_D$ | $\Delta V_L$ |
|---|---|---|---|---|---|---|---|---|
| 8 | 5 | 1 | H-1 | −560 | −500 | 4.0 | −60 | +35 |
| 9 | 6 | 2 | H-2 | −580 | −550 | 3.0 | −50 | +10 |
| 10 | 7 | 4 | H-3 | −590 | −540 | 3.0 | −45 | +20 |

From the above results, it can be understood that the photosensitive member of the present invention can exhibit sufficient characteristics even when using other compounds than styryl compounds as the charge transport substance, but particularly excellent in sensitivity, repeating characteristics, when a styryl compound is used

EXAMPLES 52–55

The photosensitive members according to the present invention No. 1, No. 2, No. 49 and No. 50 were exposed in ozone of 100 ppm for 30 minutes and further exposed in HNO₃ gas of 100 ppm for one hour, followed by measurement of the charging characteristics in entirely the same manner as in Example 1. The results are shown in Table 8.

TABLE 8

| Example | Photo-sensitive member No. | Charge Tranceport Substance No. | $V_O$ (V) | $V_D$ (V) | $E_{\frac{1}{2}}$ (lux · sec) |
|---|---|---|---|---|---|
| 52 | 1 | T-39 | −720 | −700 | 0.6 |
| 53 | 2 | T-39 | −700 | −680 | 0.8 |
| 54 | 49 | H-1 | −690 | −660 | 1.0 |
| 55 | 50 | H-2 | −710 | −690 | 1.0 |

COMPARATIVE EXAMPLES 11–15

By use of the comparative photosensitive members No. 1, No. 2, No. 4–6, charging characteristics were measured in entirely the same manner as in Example 49. The results are shown in Table 9.

TABLE 9

| Comparative Example | Comparative Photosensitive member No. | $V_O$ (V) | $V_D$ (V) | $E_{\frac{1}{2}}$ (lux · sec) |
|---|---|---|---|---|
| 11 | 1 | −500 | −400 | 1.8 |
| 12 | 2 | −600 | −560 | 1.1 |
| 13 | 4 | −660 | −620 | 2.3 |
| 14 | 5 | −490 | −450 | 5.5 |
| 15 | 6 | −520 | −490 | 4.5 |

From the above results, it can be understood that the photosensitive member of the present invention is a photosensitive member which is very stable to an oxidizable substance formed by cornea charging such as ozone, nitric acid, etc.

What is claimed is:

1. A laminated layer type electrophotographic photosensitive member having a charge generation layer and a charge transport layer on an electroconductive support, characterized in that the charge generation layer has at least one of disazo pigments is by the formulae (1) and (2);

Formula (1)

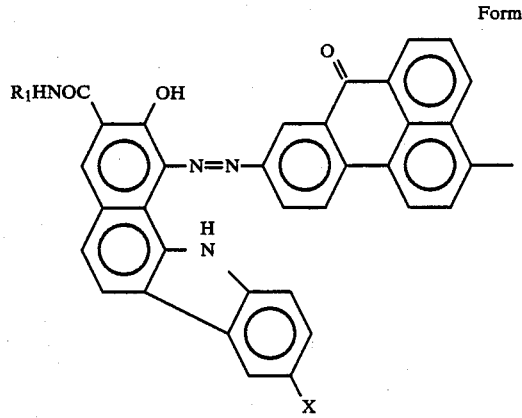

Formula (2)

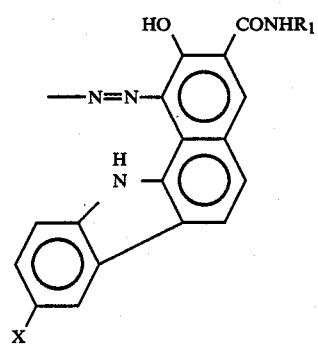

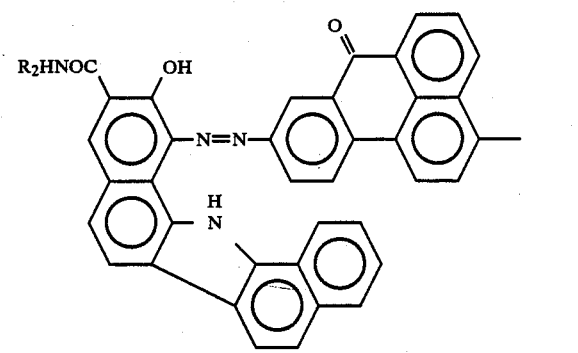

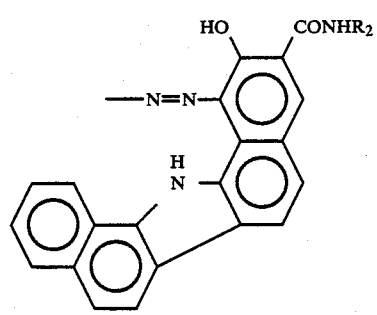

wherein $R_1$ and $R_2$ each is a group selected from the group consisting of:

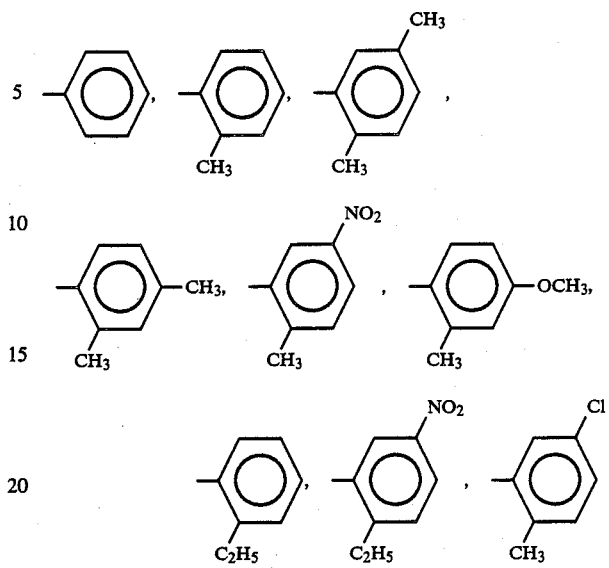

and X is halogen atom.

2. An electrophotographic photosensitive member according to claim 1, wherein the charge transport substance contained in the charge transport layer is a compound selected from the group consisting of hydrazone compounds, pyrazoline compounds, arylamine compounds, oxazole compounds and triarylmethane compounds.

3. An electrophotographic photosensitive member according to claim 1, wherein the charge transporting substance contained in the charge transport layer is a styryl compound selected from the formulae (3) and (4) shown below:

Formula (3)

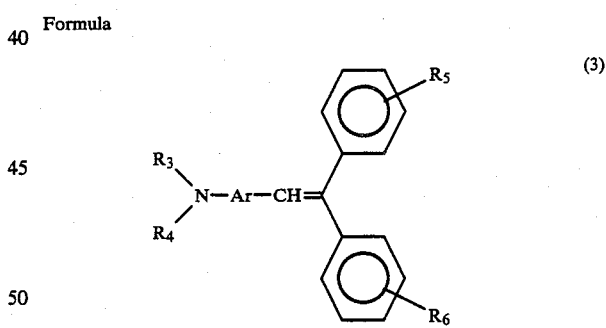

Formula (4)

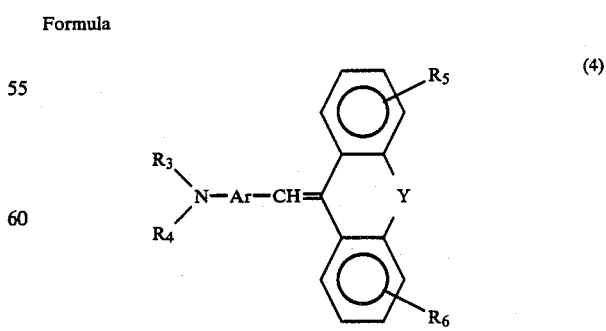

wherein $R_3$ and $R_4$ is alkyl, aralkyl, aromatic cyclic or heterocyclic group, $R_5$ and $R_6$ each is hydrogen atom, alkyl, alkoxy group or halogen atom, Ar is aromatic cyclic or heterocyclic group, and Y is a single bond, —CH$_2$—CH$_2$— or —CH=CH—.

4. An electrophotographic photosensitive member according to claim 1, wherein the charge generation layer is formed under the state wherein the above disazo pigment is dispersed in a binder resin.

5. An electrophotographic photosensitive member according to claim 1, wherein the charge transport layer is laminated on the charge generation layer.

6. An electrophotographic photosensitive member according to claim 5, wherein a subbing layer is provided between the electroconductive support and the charge generation layer.

* * * * *

UNITED STATES PATENT AND TRADEMARK OFFICE
CERTIFICATE OF CORRECTION

PATENT NO. : 4,963,450
DATED : October 16, 1990
INVENTOR(S) : HAJIME MIYAZAKI, ET AL.

It is certified that error appears in the above-identified patent and that said Letters Patent is hereby corrected as shown below:

COLUMN 1

Line 63, "61-1219048" should read --61-219048--.

COLUMN 2

Line 12, "oscillation.  The" should read
          --oscillation, the--.
  Line 30, "retion," should read --region,--.
  Line 51, "the potential" should read --its potential--.
  Line 57, "etc" should read --etc.--.

COLUMN 4

Line 35, "th" should read --the--.
  Line 62, "cules" should read --cule--.

COLUMN 32

Line 64, "3-methyligene" should read --3-methylidene--.

COLUMN 33

Line 2, "like" should read --like;--.
  Line 12, "8 µm" should read --5 µm--.

COLUMN 34

Line 54, "6 µm" should read --5 µm-- and
          "0.6 µm" should read --0.5 µm--.

UNITED STATES PATENT AND TRADEMARK OFFICE
CERTIFICATE OF CORRECTION

PATENT NO. : 4,963,450
DATED : October 16, 1990
INVENTOR(S) : HAJIME MIYAZAKI, ET AL.

It is certified that error appears in the above-identified patent and that said Letters Patent is hereby corrected as shown below:

COLUMN 35

Line 24, "wa" should read --was--.

COLUMN 36

Line 2, "become 200 V" should read --become -200 V--.
Line 28, "retion" should read --region--.

COLUMN 38

Line 57, "$V_o$: 700 V" should read --$V_o$: -700 V--.

COLUMN 39

Line 20, "$V_o$: 680 V" should read --$V_o$: -680 V--.
Line 21, "$V_D$: 640 V" should read --$V_D$: -640 V--.
Line 43, "chanded" should read --changed--.
Line 50, In Table 4, ""Diazo" should read --Disazo--.
Line 60, In Table 4, "-21" should read -- -12--.

COLUMN 40

Line 19, In Table 4-continued, "Diazo" should read --Disazo--.
Line 46, "photosensitive members No. 2" should read --photosensitive members No. 1, No. 2--.

UNITED STATES PATENT AND TRADEMARK OFFICE
CERTIFICATE OF CORRECTION

PATENT NO. : 4,963,450
DATED : October 16, 1990
INVENTOR(S) : HAJIME MIYAZAKI, ET AL.　　　　　　　　Page 3 of 3

It is certified that error appears in the above-identified patent and that said Letters Patent is hereby corrected as shown below:

COLUMN 42

Line 16, In Table 8, "Trance-" should read --Trans- --.
　　Line 52, "cornea" should read --corona--.

COLUMN 43

Line 2, "is by" should read --of--.

COLUMN 44

Line 66, "is" should read --each is--.

Signed and Sealed this

Twenty-fifth Day of June, 1991

Attest:

HARRY F. MANBECK, JR.

Attesting Officer　　　　Commissioner of Patents and Trademarks